(12) United States Patent
Gutierrez Cabrera et al.

(10) Patent No.: US 11,565,627 B2
(45) Date of Patent: Jan. 31, 2023

(54) RECONFIGURABLE STORAGE ASSEMBLY FOR A VEHICLE

(71) Applicant: GM GLOBAL TECHNOLOGY OPERATIONS LLC, Detroit, MI (US)

(72) Inventors: Jair Ivan Gutierrez Cabrera, Toluca (MX); Joaquin Hidalgo Guzman, Distrito Federal (MX); Cesar Daniel Madrid Ramirez, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 529 days.

(21) Appl. No.: 16/661,426

(22) Filed: Oct. 23, 2019

(65) Prior Publication Data

US 2021/0122297 A1   Apr. 29, 2021

(51) Int. Cl.
*B60R 5/04* (2006.01)
*B60R 7/00* (2006.01)
*B60R 7/08* (2006.01)
*B60R 11/00* (2006.01)

(52) U.S. Cl.
CPC ............ *B60R 5/04* (2013.01); *B60R 7/005* (2013.01); *B60R 7/08* (2013.01); *B60R 2011/0029* (2013.01); *B60R 2011/0045* (2013.01); *B60R 2011/0085* (2013.01)

(58) Field of Classification Search
CPC ............ B60R 5/04; B60R 7/005; B60R 7/08
USPC .................... 296/37.8, 37.14, 37.16
See application file for complete search history.

(56) References Cited

U.S. PATENT DOCUMENTS

| 5,915,777 A | * | 6/1999 | Gignac | B60N 3/12 |
| | | | | 224/543 |
| 6,733,060 B1 | * | 5/2004 | Pavkov | B60R 7/02 |
| | | | | 224/543 |
| 6,811,196 B2 | * | 11/2004 | Gammon | B60R 7/08 |
| | | | | 296/37.16 |
| 7,059,646 B1 | * | 6/2006 | DeLong | B60R 5/04 |
| | | | | 296/37.16 |

(Continued)

FOREIGN PATENT DOCUMENTS

| DE | 19837278 A1 | * | 3/2000 | ............... B60R 7/02 |
| DE | 102004019029 A1 | * | 11/2005 | ............... B60P 7/14 |

(Continued)

OTHER PUBLICATIONS

English translation of KR 20140037520; retrieved via KIPRIS located at http://www.kipris.or.kr/enghome/main.jsp. (Year: 2014).*

*Primary Examiner* — Jason S Daniels

(57) ABSTRACT

A reconfigurable storage assembly for a vehicle includes a first floor panel and a second floor panel. The first floor panel includes a first outboard region, a first inboard region, and a first underside surface. The first outboard region is configured to be coupled to a base of the vehicle. The first floor panel is configured to pivot in a first rotational direction from a first closed position to a first open position. The second floor panel includes a second outboard region, a second inboard region, and a second underside surface. The second outboard region is configured to be coupled to the base. The second floor panel is configured to pivot in a second rotational direction opposite the first rotational direction from a second closed position to a second open position.

18 Claims, 9 Drawing Sheets

(56) References Cited

U.S. PATENT DOCUMENTS

| | | | | |
|---|---|---|---|---|
| 2010/0270821 A1* | 10/2010 | Ulita | ................ | B60R 5/04 |
| | | | | 296/37.16 |
| 2018/0326913 A1* | 11/2018 | White | ................ | B60R 5/048 |
| 2019/0232875 A1* | 8/2019 | Flores Marin | ................ | B65D 7/24 |

FOREIGN PATENT DOCUMENTS

| | | | | | |
|---|---|---|---|---|---|
| DE | 102005015859 B3 | * | 5/2006 | ............ | B60R 7/005 |
| FR | 2903051 A3 | * | 1/2008 | ............ | B60R 7/005 |
| GB | 2474139 A | * | 4/2011 | ............ | B60N 3/004 |
| KR | 20140037520 A | * | 3/2014 | ............ | B60R 7/005 |

\* cited by examiner

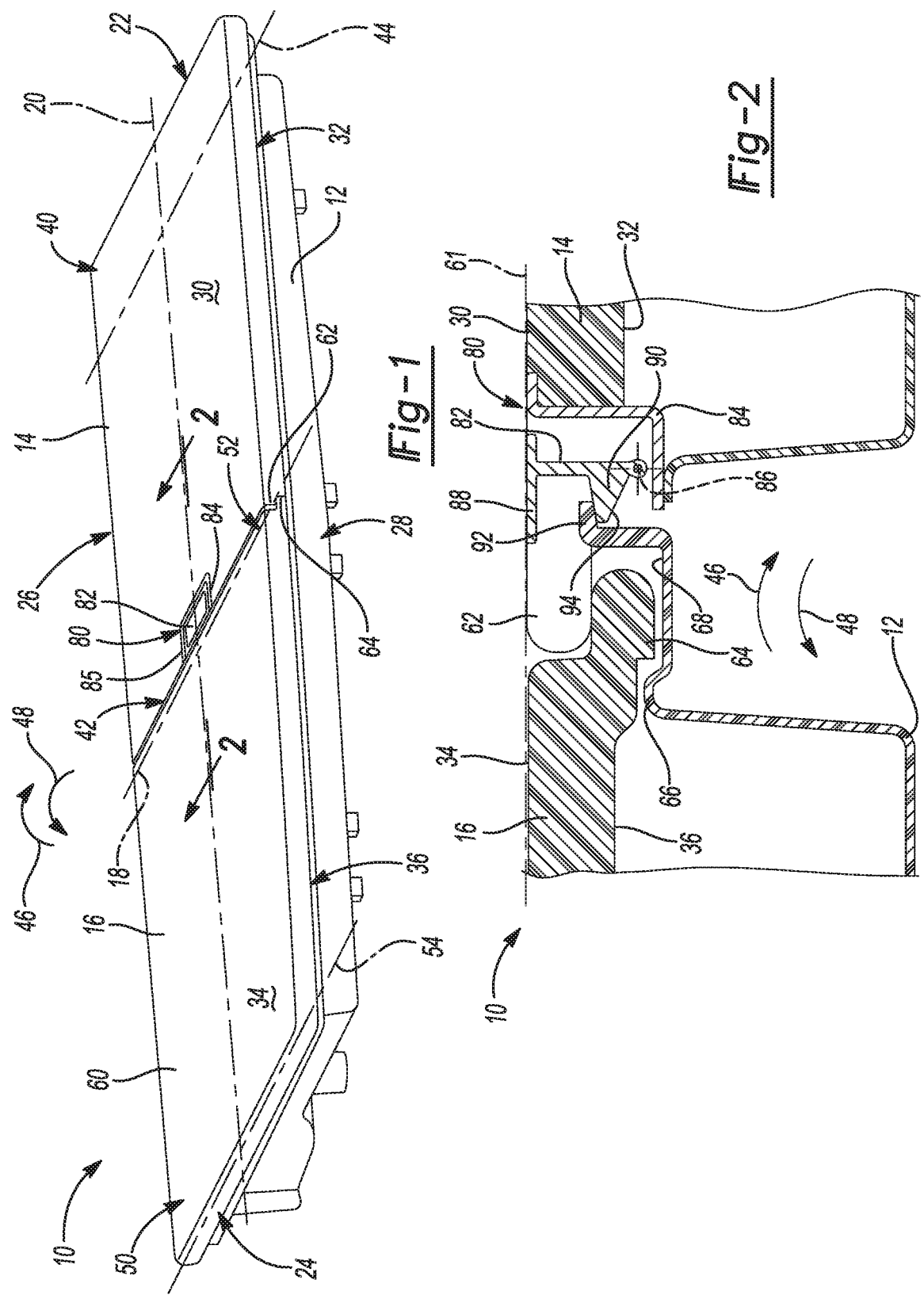

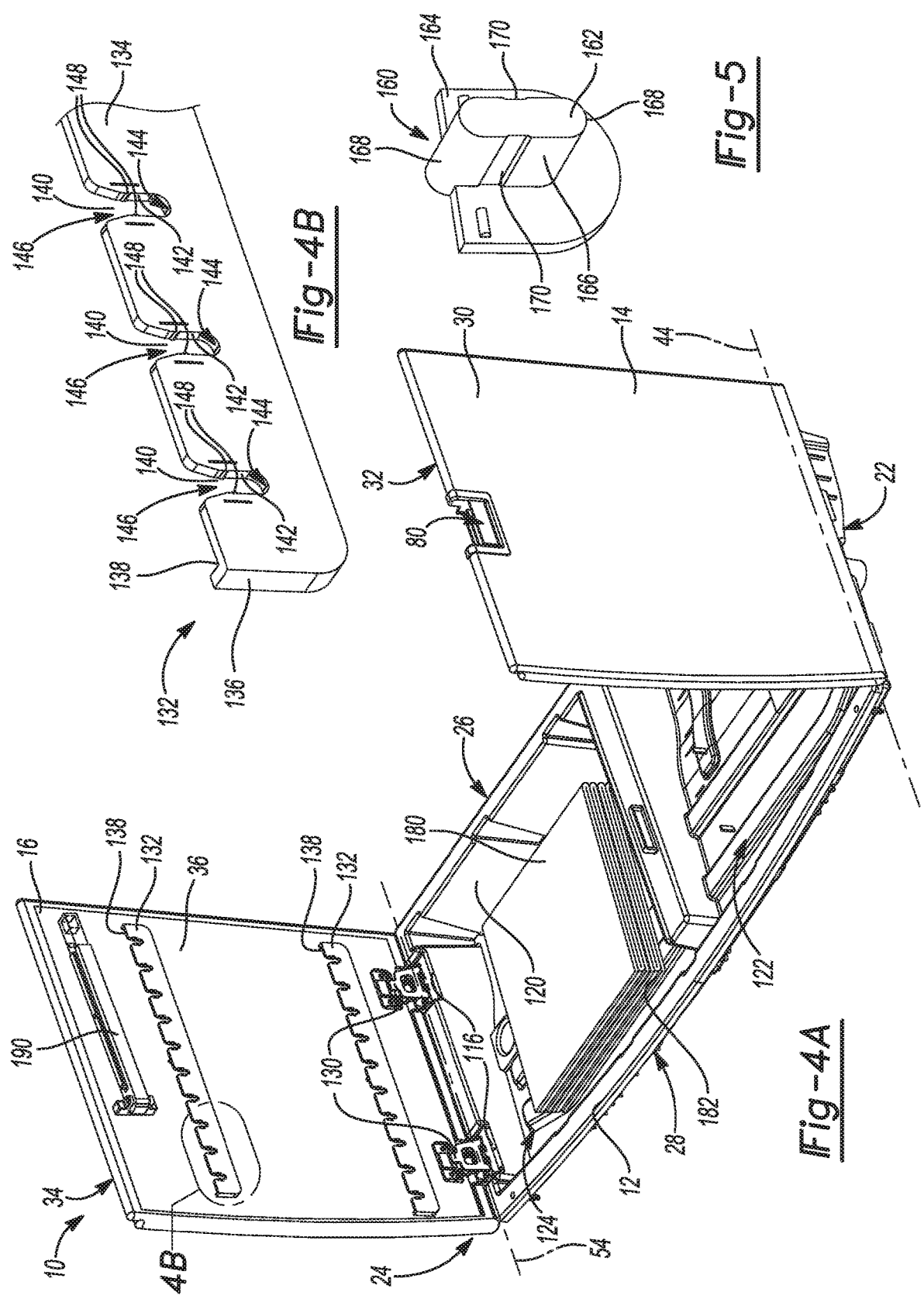

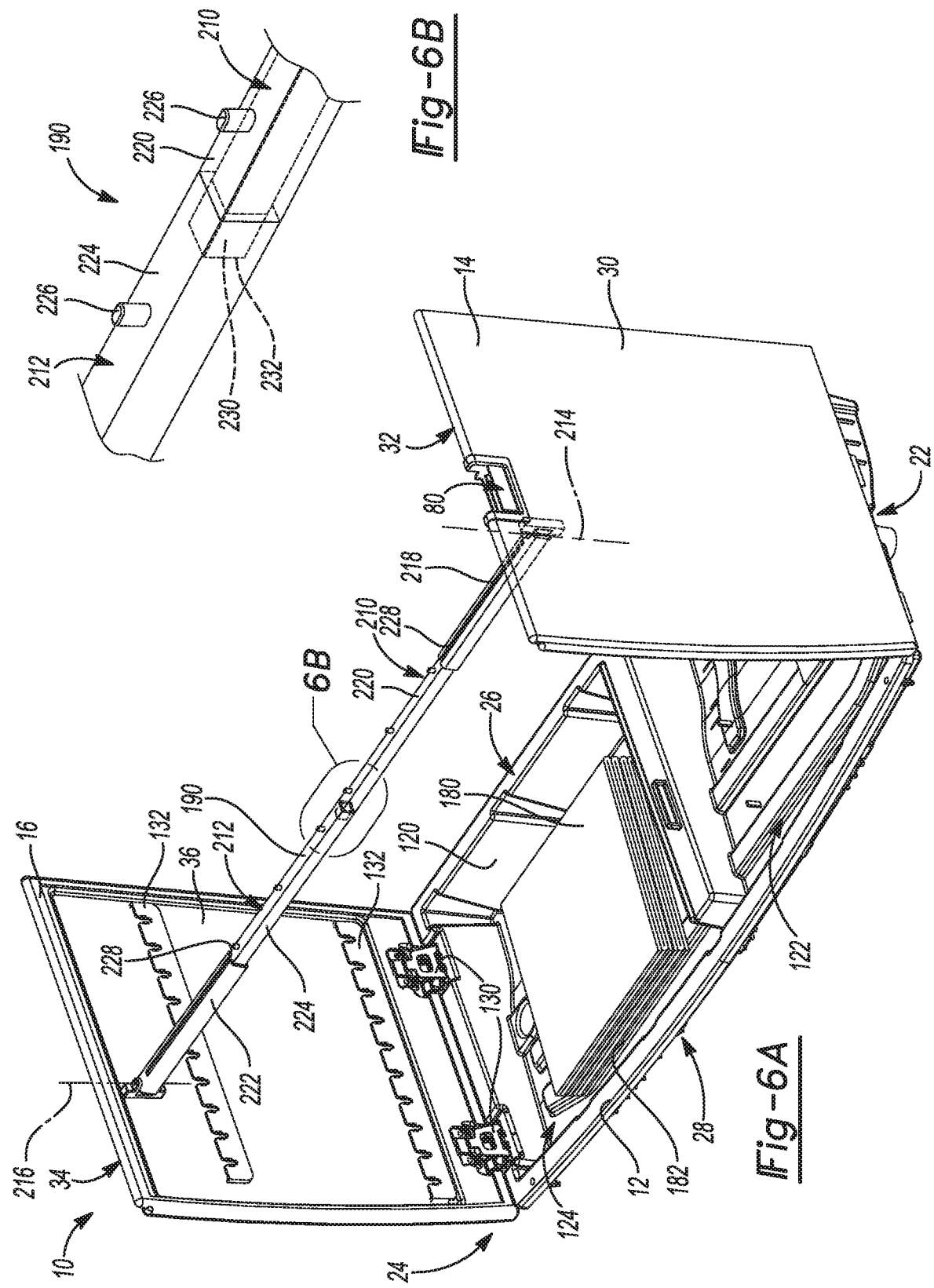

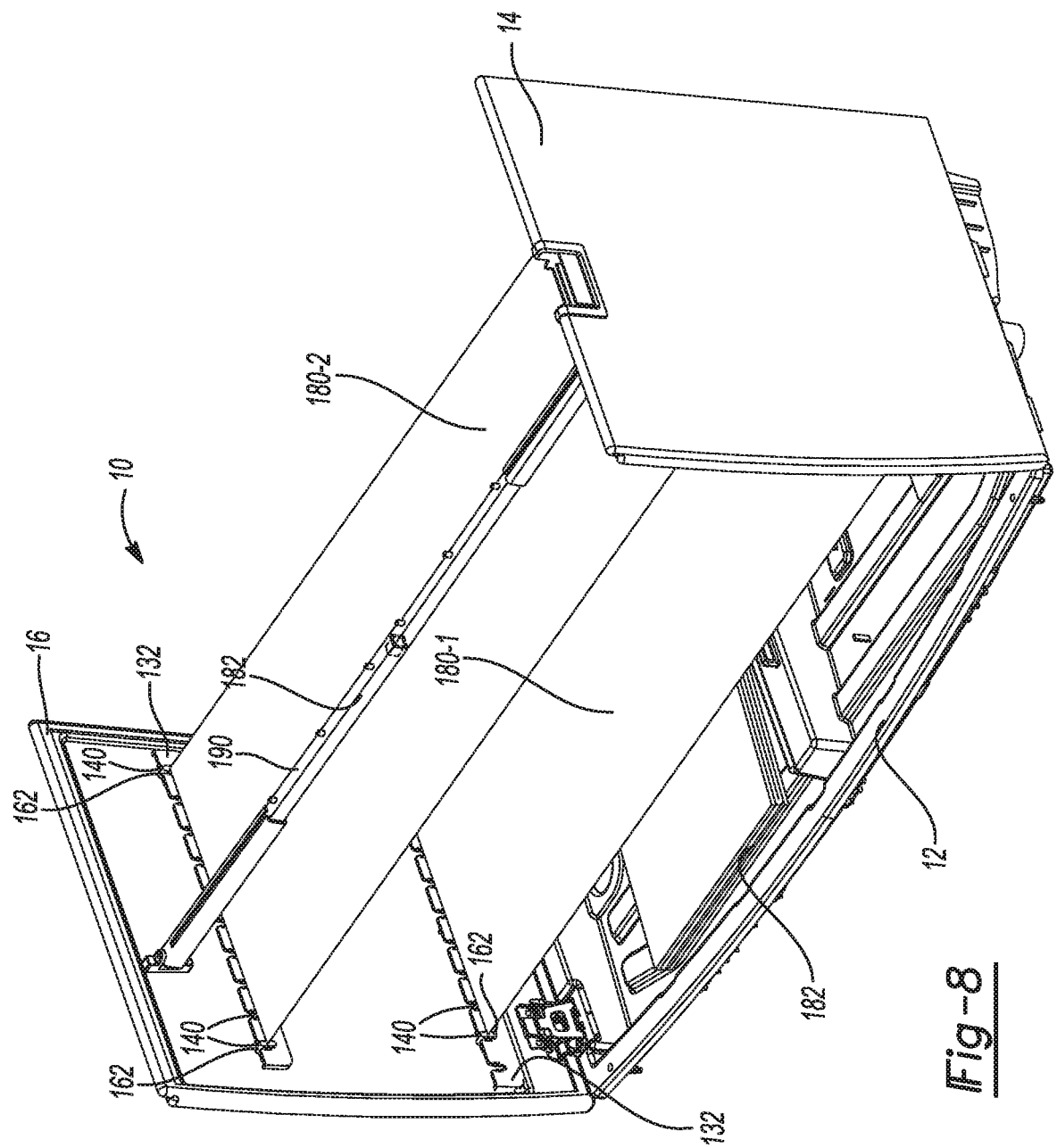

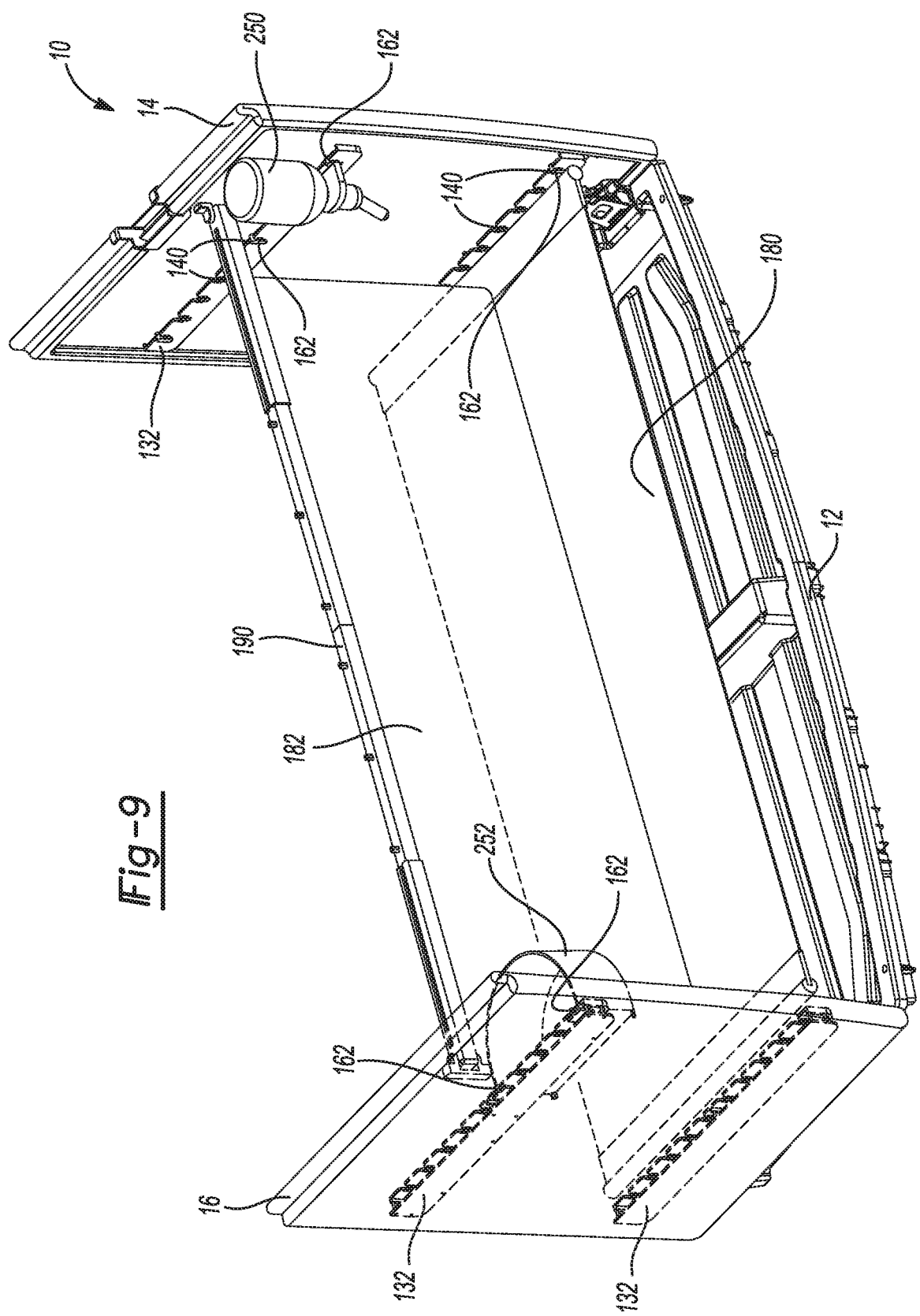

RECONFIGURABLE STORAGE ASSEMBLY FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a reconfigurable storage assembly for a vehicle.

Many vehicles are equipped with one or more storage areas. For example, storage areas may be located in a trunk, a rear portion of a passenger cabin, a console between seats, or a truck bed. Some storage compartments are covered with a lid or a cover that can be opened to provide access to the storage compartment.

SUMMARY

A reconfigurable storage assembly for a vehicle according to the principles of the present disclosure includes a first floor panel and a second floor panel. The first floor panel includes a first outboard region, a first inboard region, and a first underside surface. The first outboard region is configured to be coupled to a base of the vehicle. The first floor panel is configured to pivot in a first rotational direction from a first closed position to a first open position. The second floor panel includes a second outboard region, a second inboard region, and a second underside surface. The second outboard region is configured to be coupled to the base. The second floor panel is configured to pivot in a second rotational direction opposite the first rotational direction from a second closed position to a second open position.

In one aspect, the first floor panel in the first closed position and the second floor panel in the second closed position are configured to cooperate to prevent access to an underfloor storage compartment at least partially defined by the base. The first underside surface faces the second underside surface when the first floor panel is in the first open position and the second floor panel is in the second open position.

In one aspect, the reconfigurable storage assembly further includes a transversely-extendable bar coupled to at least one of the first underside surface and the second underside surface, the transversely-extendable bar being movable between a collapsed configuration and an extended configuration in which the transversely-extendable bar extends across a gap defined by the first floor panel in the first open position and the second floor panel in the second open position.

In one aspect, the transversely-extendable bar includes a plurality of vertically-extending protrusions.

In one aspect, the reconfigurable storage assembly further includes a closure assembly. The closure assembly is coupled to at least one of the first floor panel and the second floor panel. The closure assembly is configured to retain the first floor panel in the first closed position and the second floor panel in the second closed position.

In one aspect, the closure assembly includes a latch pivotally coupled to the first inboard region of the first floor panel. The latch is configured to engage the base to retain the first floor panel in the first closed position. The second inboard region of the second floor panel is disposed between the base and the first inboard region such that the second floor panel is retained in the second closed position.

In one aspect, the reconfigurable storage assembly further includes a partition. The partition is configured to be disposed in a stowed configuration or an installed configuration. In the installed configuration, the partition extends transversely across at least a portion of a gap between the first floor panel in the first open position and the second floor panel in the second open position.

In one aspect, the partition is configured to extend parallel to a floor plane. The floor plane is defined by the first floor panel in the first closed position and the second floor panel in the second closed position.

In one aspect, the reconfigurable storage assembly further includes a plurality of fastener components. Each fastener component of the plurality of fastener components is coupled to the first underside surface or the second underside surface.

In one aspect, each fastener component of the plurality of fastener components includes a rail. Each rail defines a plurality of receptacles.

In one aspect, the reconfigurable storage assembly further includes a plurality of accessories configured to be selectively coupled to at least a portion of the plurality of fastener components.

In one aspect, the plurality of accessories includes a bottle holder configured to hold a bottle. The bottle holder includes a first portion configured to support the bottle and a second portion configured to retain a neck of the bottle.

In one aspect, the plurality of accessories includes a flexible pocket.

In one aspect, the plurality of accessories includes a container having a body and an interior region.

In one aspect, the container is padded. The container is configured to retain an electronic device.

In one aspect, the first floor panel is configured to pivot 90° between the first open position and the first closed position. The second floor panel is configured to pivot 90° between the second open position and the second closed position.

In one aspect, the first floor panel is configured to be retained in a first intermediate position between the first open position and the first closed position. In one aspect, the second floor panel is configured to be retained in a second intermediate position between the second open position and the second closed position.

In one aspect, the reconfigurable storage assembly further includes a first torque hinge and a second torque hinge. The first torque hinge is coupled to the first outboard region of the first floor panel. The second torque hinge is coupled to the second outboard region of the second floor panel.

In one aspect, a reconfigurable storage assembly according to the principles of the present disclosure includes a base, a first floor panel, and a second floor panel. The base at least partially defines an underfloor storage compartment. The first floor panel includes a first outboard region coupled to the base, a first inboard region, and a first underside surface. The first floor panel is configured to pivot with respect to the base in a first rotational direction from a first closed position to a first open position and a second rotational direction opposite the first rotational direction from the first open position to the first closed position. The second floor panel includes a second outboard region coupled to the base, a second inboard region, and a second underside surface. The second floor panel is configured to pivot in the second rotational direction from a second closed position to a second open position and the first rotational direction from the second open position to the second closed position.

A reconfigurable storage assembly according to the principles of the present disclosure includes a base, a first floor panel, a second floor panel, a partition, and a container. The base at least partially defines an underfloor storage compartment. The first floor panel includes a first outboard region coupled to the base, a first inboard region, and a first underside surface. The first floor panel is configured to pivot with respect to the base in a first rotational direction from a first closed position to a first open position and a second rotational direction opposite the first rotational direction from the first open position to the first closed position. The second floor panel includes a second outboard region coupled to the base, a second inboard region, and a second underside surface. The second floor panel is configured to pivot in the second rotational direction from a second closed position to a second open position and the first rotational direction from the second open position to the second closed position. The partition is configured to be disposed in a stowed configuration or an installed configuration in which the partition is coupled to the first underside surface of the first floor panel in the first open position and the second underside surface of the second floor panel in the second open position. The container is configured to be coupled to at least one of the first underside surface and the second underside surface. The container is configured to dispense food or water for an animal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a perspective view of a reconfigurable storage assembly according to the present disclosure, the reconfigurable storage assembly being in a fully-closed configuration;

FIG. 2 is a partial sectional view of a closure assembly of the reconfigurable storage assembly of FIG. 1, taken at line 2-2 of FIG. 1;

FIG. 4A is a perspective view of the reconfigurable storage assembly of FIG. 1, the reconfigurable storage assembly being in a fully-open configuration;

FIG. 4B is a detail view of a portion of a fastener of the reconfigurable storage assembly of FIG. 4A;

FIG. 5 is a perspective view of a protrusion of an accessory of the storage assembly of FIG. 4A according to the present disclosure;

FIG. 6A is a perspective view of the reconfigurable storage assembly of FIG. 1, the reconfigurable storage assembly being in the fully-open configuration, a transverse bar being in an extended position;

FIG. 6B is a detail view of the transverse bar of FIG. 6A;

FIG. 8 is a perspective view of the reconfigurable storage assembly of FIG. 6A, the reconfigurable storage assembly being in a second configuration;

FIG. 9 is a perspective view of the reconfigurable storage assembly of FIG. 6A, the reconfigurable storage assembly being in a third configuration;

In the drawings, reference numbers may be reused to identify similar and/or identical elements.

DETAILED DESCRIPTION

Figure 3:
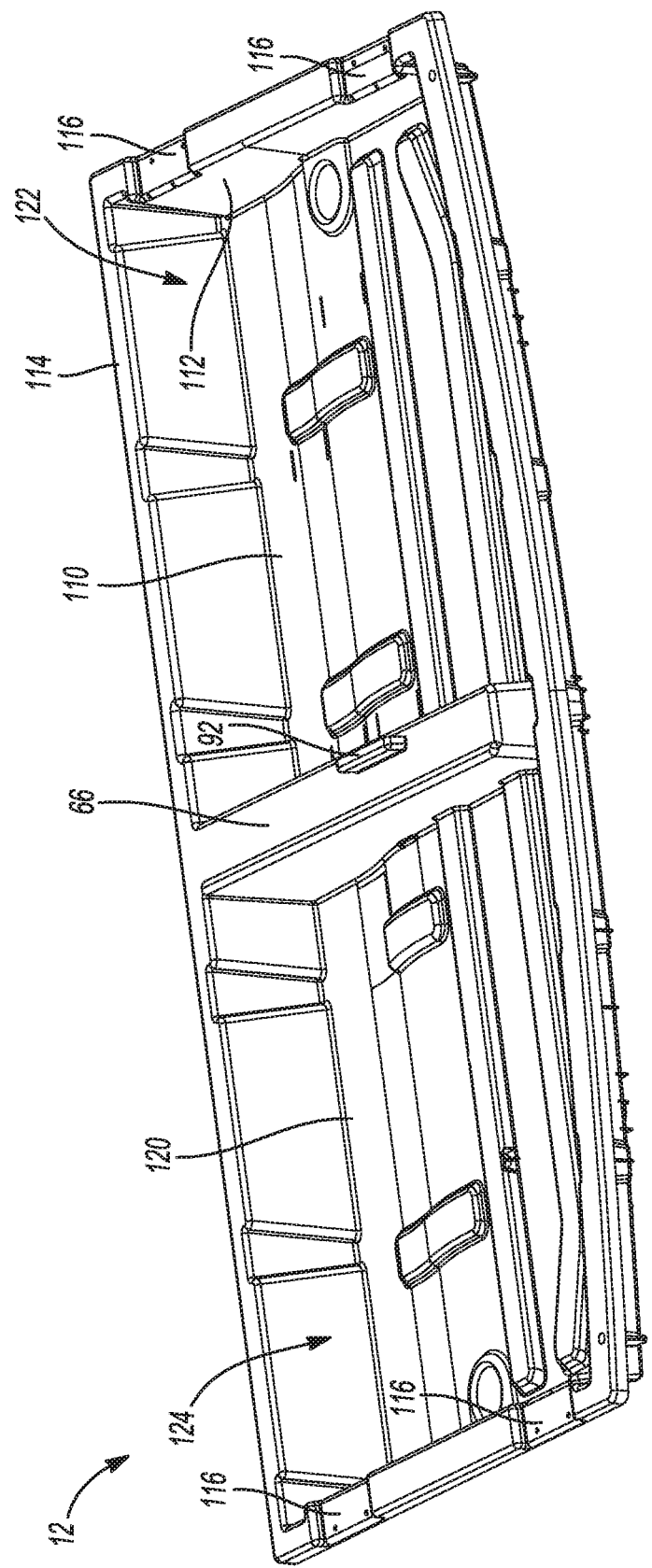
FIG. 3 is a perspective view of a base of the reconfigurable storage assembly of FIG. 1.

As described above, many vehicles include storage areas. For example, vehicles typically include rear storage areas behind passenger seating areas. A rear storage area may be accessed by opening a rear vehicle hatch. Rear storage areas generally include a load floor for supporting vehicle cargo. Storage area sizes, and particularly fore-aft and side-to-side spacing, are typically limited due to vehicle packaging requirements. Maximizing use of vertical storage area space may be challenging when cargo is not suitable for stacking. Furthermore, when cargo is stacked, some items may not be readily accessible to a user.

In some vehicles, the load floor may be temporarily lifted so that a user can access an underfloor storage compartment. The load floor is typically pivotally connected toward a front of the storage area (i.e., closer to a front of the vehicle) so that the underfloor storage compartment is accessible to the user near the rear hatch. When a load floor is raised to provide access to the underfloor storage compartment, the load floor may inhibit visibility through a rear window. Accordingly, load floors are lowered to prevent access to the underfloor storage compartment prior to operating the vehicle.

The present disclosure provides a reconfigurable storage assembly for a vehicle. The storage assembly may be used in a rear vehicle storage area, for example. The storage assembly includes a load floor having two floor panels that meet at or near a center of the storage area. The floor panels open in opposing rotational directions toward the sides of the vehicle to provide access to an underfloor storage compartment. The floor panels do not inhibit driver visibility and may be left open during operation of the vehicle. The floor panels are reconfigurable in that they are independently movable between closed and open positions and, in some examples, may be retained at intermediate positions between fully opened and fully closed.

The reconfigurable storage assembly includes storage features to increase use and/or ease of use of vertical storage space. The storage assembly includes a transverse bar that may extend between the open floor panels. The bar can be used to suspend items above cargo that is stowed below, such as in the underfloor storage compartment. The panels may also include fasteners for selectively coupling accessories to the underside of the floor panels. Accessories may include containers, additional fasteners, or items for use during travel, such as tools, safety kits, and/or pet-related items. A user may readily add, move, and remove accessories as needed. The accessories may be stowed in the underfloor storage compartment when they are not in use.

With reference to FIG. 1, a reconfigurable storage assembly 10 according to the present disclosure is provided. The reconfigurable storage assembly 10 generally includes a base 12, a first floor panel 14, and a second floor panel 16. The first and second floor panels 14, 16 are pivotally coupled to the base. The reconfigurable storage assembly 10 may be disposed on a vehicle, such as in a rear cargo area in a passenger cabin. The floor panels 14, 16 may be configured to support a load. Although the first and second floor panels 14, 16 are depicted as being solid (FIG. 2), they may alternatively be hollow, partially hollow, or have a layered construction.

The reconfigurable storage assembly 10 may extend along a longitudinal axis 18 and a transverse axis 20. When the reconfigurable storage assembly 10 is disposed on a vehicle, the longitudinal axis 18 may correspond a fore-aft direction of the vehicle. The transverse axis 20 may correspond to a side-to-side or cross-car direction. Accordingly, the reconfigurable storage assembly 10 may extend between a first side 22 and a second side 24 that are spaced apart along the longitudinal axis 18, and a third or front side 26 and a fourth or rear side 28 that are spaced apart along the transverse axis 20.

The first floor panel 14 includes a first outside surface 30 and a first underside surface 32 opposite the first outside surface 30. The second floor panel 16 includes a second outside surface 34 and a second underside surface 36 opposite the second outside surface. The first and second underside surface 32, 36 are disposed toward the base 12.

The first floor panel 14 includes a first outboard region 40 and a first inboard region 42. The first outboard region 40 is disposed at or adjacent to the first side 22 of the reconfigurable storage assembly 10. The first floor panel 14 is pivotable with respect to the base 12 between a first closed position, as shown, and a first open position (FIG. 4).

The first floor panel 14 is pivotable about a first pivot axis 44 that extends through the first outboard region 40. The first floor panel 14 pivots in a first rotational direction 46 from the first closed position to the first open position. The first floor panel 14 pivots in a second rotational direction 48 opposite the first rotational direction 46 from the first open position to the first closed position. In some examples, the first floor panel 14 travels through an angle of 90° between the first closed position and the first open position.

The second floor panel 16 includes a second outboard region 50 and a second inboard region 52. The second outboard region 50 is disposed at or adjacent to the second side of the reconfigurable storage assembly 10. The second floor panel 16 is pivotable with respect to the base 12. The second floor panel 16 is pivotable with respect to the base 12 between a second closed position, as shown, and a second open position (FIG. 4).

The second floor panel 16 is pivotable about a second pivot axis 54 that extends through the second outboard region 50. The second floor panel 16 pivots in the second rotational direction 48 from the second closed position to the second open position. The second floor panel 16 pivots in the first rotational direction 46 from the second open position to the second closed position. In some examples, the second floor panel 16 travels through an angle of 90° between the second closed position and the second open position.

The first and second floor panels 14, 16 are independently pivotable with respect to the base 12. When the first and second floor panels 14, 16 are in the first and second closed positions, respectively, the reconfigurable storage assembly 10 is in a fully-closed configuration (FIG. 1). When the first and second floor panels 14, 16 are in the first and second open positions, respectively, the reconfigurable storage assembly 10 is in the fully-open configuration (FIG. 4).

In the fully-closed configuration, the first and second floor panels 14, 16 cooperate to form a load floor 60 defining a floor plane (FIG. 2). The load floor 60 may cover the base 12. In some examples, the first and second underside surfaces 32, 36 may be in direct contact with the base 12. In some examples, the load floor 60 covers the entire base 12 so that the base 12 is not visible within a passenger cabin of the vehicle. The first and second outside surface 30, 34 may be exposed to the passenger cabin. In other examples, the first and second outside surfaces 30, 34 may be covered, such as by a mat. The first and second outside surface 30, 34 may be coplanar. The first and second underside surfaces 32, 36 may be coplanar.

The first floor panel 14 includes a first lip 62 disposed at or adjacent to the first inboard region 42. The first lip 62 extends toward the second side 24 of the reconfigurable storage assembly 10. The first lip 62 may be parallel to the longitudinal axis 18. The first outside surface 30 extends across the first lip 62.

The second floor panel 16 includes a second lip 64 disposed at or adjacent to the second inboard region 52. The second lip 64 extends toward the first side 22 of the reconfigurable storage assembly 10. The second lip 64 may be parallel to the longitudinal axis 18. The second underside surface 36 extends across the second lip 64.

As best shown in FIG. 2, when the reconfigurable storage assembly 10 is in the fully-closed configuration, a portion of the second floor panel 16 is disposed between the base 12 and a portion of the first floor panel 14. More particularly, the second lip 64 is disposed between the first lip 62 and a longitudinal ridge 66 of the base 12. The longitudinal ridge 66 may include a longitudinal pocket 68 into which the second lip 64 is at least partially disposed.

The reconfigurable storage assembly 10 further includes a closure assembly 80. The closure assembly 80 generally includes a latch 82 and a frame 84. The frame 84 is coupled to the first floor panel 14. The frame 84 is disposed at or near the first inboard region 42 of the first floor panel 14. The frame 84 may be disposed within a notch 85 of the first floor panel 14.

The latch 82 is pivotally coupled to the frame 84. The latch 82 is pivotable about a latch axis 86. The latch axis 86 may extend parallel to the longitudinal axis 18. In some examples, the latch 82 is pivotable in both the first rotational direction 46 and the second rotational direction 48. In some examples, the closure assembly 80 may further include one or more springs, such as torsion springs, to bias the latch in a neutral position, as shown in FIG. 2.

The latch 82 may include a handle 88 and a first or latch projection 90. The handle 88 may be accessible to a user when the reconfigurable storage assembly 10 is in the fully-closed configuration. The user may grasp the handle 88 to pivot the latch 82 about the latch axis 86.

Engagement of the first underside surface 32 with the base 12 prevents the first floor panel 14 from pivoting in the second direction 48 past the first closed position. The latch projection 90 is configured to engage the base 12 to fix the first inboard region 42 of the first floor panel 14 to the longitudinal ridge 66 of the base 12. Engagement of the latch 82 with a third lip 92 of the base 12 prevents the first floor panel 14 from pivoting in the first rotational direction 46 past the first closed position, thereby retaining the first floor panel 14 in the first closed position.

Engagement of the second underside surface 36 with the base prevents the second floor panel 16 from pivoting in the first direction 46 past the second closed position. The first lip 62 of the first floor panel 14 is configured to engage the second lip 64 of the second floor panel 16. Engagement of the first lip 62 with the second lip 64 prevents the second floor panel 16 from pivoting in the second rotational direction 48 past the second closed position, thereby retaining the second door panel 16 in the second closed position.

Accordingly, the closure assembly 80 is configured to retain the reconfigurable storage assembly in the fully-closed configuration. In other examples, a second floor panel includes a closure assembly that engages a base and sandwiches a first floor panel therebetween to retain a storage assembly in a fully-closed configuration. In yet other examples, first and second floor panels may engage one another to retain a storage assembly in a fully-closed configuration. In yet other examples, first and second floor panels may independently engage a base to retain the first and second floor panels in respective first and second closed positions.

The reconfigurable storage assembly 10 may be moved from the fully-open configuration to the fully-closed configuration. In one example, the second floor panel 16 is pivoted in the first rotational direction 46 to the second closed position. The first floor panel 14 is pivoted in the second rotational direction 48 to the first closed position. A sloped surface 94 of the latch projection 90 may engage the third lip 92 to pivot the latch 82 in the first rotational direction 46 so that the latch projection 90 can slide past the third lip 92. The latch 82 may pivot in the second rotational direction 48, either by a biasing force provided by a spring or torque applied by a user.

The reconfigurable storage assembly 10 may be moved from the fully-closed configuration to the fully-open configuration. In one example, the latch 82 is pivoted in the second rotational direction 48 to disengage the latch projection 90 from the third lip 92. Concurrently, the first floor panel 14 is pivoted in the first rotational direction 46 to the first open position. The second floor panel 16 is pivoted in the second rotational direction to the second open position.

Referring to FIG. 3, the base 12 generally includes a lower wall 110, a peripheral wall 112, an upper wall 114, and the longitudinal ridge 66. The upper wall 114 defines a plurality of recesses 116 (e.g., four recesses). The lower wall 110 and the peripheral wall 112 may define a plurality of protrusions and/or depressions to provide rigidity, meet packaging requirements, or provide storage functionality. Features that provide storage functionality may include cup holders or protrusions to prevent cargo from sliding during motion of the vehicle, by way of example.

The base 12 at least partially defines an underfloor storage compartment 120. The underfloor storage compartment 120 includes a first portion 122 and a second portion 124. The longitudinal ridge 66 is disposed between the first and second portions 122,124.

When the reconfigurable storage assembly 10 (FIG. 1), is in the fully-closed configuration, the first and second panels 14, 16 (FIG. 1) cooperate to prevent access to the underfloor storage compartment 120. The first floor panel 14 may engage the longitudinal ridge 66 and a portion of the upper wall 114 to cover the first portion 122 of the underfloor storage compartment 120. The second floor panel 16 may engage the longitudinal ridge 66 and another portion of the upper wall 114 to cover the second portion 124 of the underfloor storage compartment 120.

With reference to FIGS. 4A-4B, the reconfigurable storage assembly 10 in the fully-open configuration according to the principles of the present disclosure is provided. The first and second floor panels 14, 16 are coupled to the base 12 by a plurality of hinges 130 disposed within the recesses 116, respectively. The hinges 130 may be torque hinges 130. Accordingly, the first floor panel 14 may be retained at any angular position, which may be referred to as a first intermediate position, between the first closed position and the first open position. The second floor panel 16 may be retained at any angular position, which may be referred to as a second intermediate position, between the second closed position and the second open position.

The reconfigurable storage assembly 10 includes a plurality of first fastener components 132 for selectively coupling one or more accessories to the first underside surface 32 and/or the second underside surface 36. In one example, each first fastener component 132 may include a rail 134 and a flange 136 extending perpendicular from the rail. The flange 136 is coupled to the first underside surface 32 or the second underside surface 36. The rail 134 is spaced apart from the first or second underside surface 32, 36 to define a gap 138.

The rail 134 defines a plurality of first or fastener receptacles 140, such as elongated slots. When the reconfigurable storage assembly 10 is in the fully-open configuration, the fastener receptacles 140 may be vertically extending. The fastener receptacles 140 may be at least partially defined by a receptacle surface 142 having a rounded portion 144. The receptacle surface 142 is discontinuous such that each fastener receptacle 140 has an open end 146. A pair of diametrically-opposed protrusions 148 extend from the receptacle surface 142 into the fastener receptacle 140 and toward one another.

In one example, when the reconfigurable storage assembly 10 is in the fully-open configuration, the rails 134 extend parallel to the longitudinal axis 18 (FIG. 1). Each of the first and second floor panel 14, 16 may include two first fastener components 132. The two first fastener components 132 may be vertically spaced apart and may extend parallel to one another. In some examples, the first fastener components 132 may be removable and height-adjustable with respect to a floor panel. In some examples, a storage assembly includes a plurality of discrete first fastener components, each having a single receptacle. In some examples, first fastener components omit rails in favor of slots formed directly in first and second floor panels.

Figure 14:
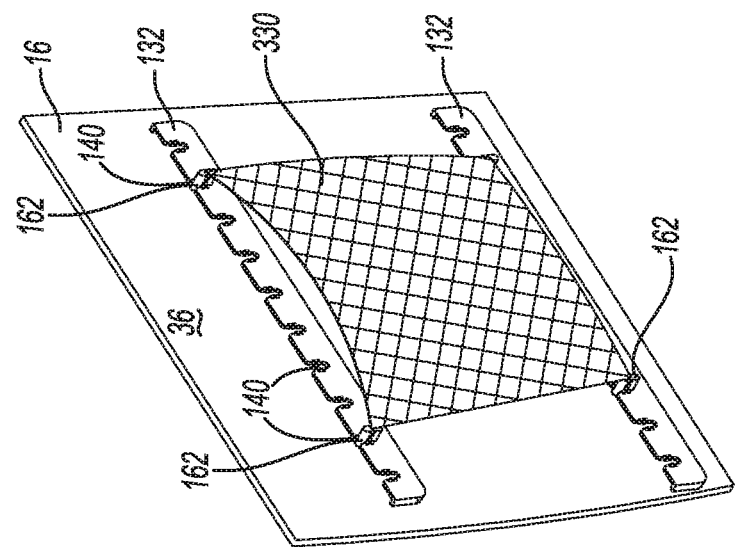
FIG. 14 is a perspective view of a pocket according to the present disclosure, the pocket being coupled to a floor panel of the reconfigurable storage assembly of FIG. 1.

Referring to FIG. 5, a second fastener component 160 according to the principles of the present disclosure is provided. The second fastener component 160 is configured to be coupled to or integrally formed with an accessory (e.g., cover 180 of FIG. 7, wall 182 of FIG. 7, water bottle 250 of FIG. 9, food dish 252 of FIG. 9, container 260 of FIG. 10, bottle holder 280 of FIG. 12, electronics sleeve 310 of FIG. 13, pocket 330 of FIG. 14) to be selectively coupled to the first or second floor panel 14, 16. The second fastener component 160 generally includes a second or fastener projection 162 and a skirt 164.

The fastener projection 162 is configured to be received by a fastener receptacle 140 of the first fastener component 132 to couple the second fastener component 160 and associated accessory to the first or second floor panel 14, 16. The fastener projection 162 includes a peripheral surface 166 having opposing rounded sides 168. The fastener projection 162 may be elongated.

The peripheral surface 166 of the fastener projection 162 defines a pair of diametrically-opposed grooves 170. The grooves 170 are configured to receive respective protrusions 148 of the fastener receptacle 140 when the fastener projection 162 is inserted into the fastener receptacle 140. Engagement of the protrusions 148 in the grooves 170 may facilitate alignment of the fastener projection 162 within the fastener receptacle 140. In some examples, the fastener projection 162 may have a snap-fit within the fastener receptacle 140.

The skirt 164 extends perpendicular to the peripheral surface 166 of the fastener projection 162. The skirt 164 may engage the rail 134 of the first fastener component 132 when the fastener projection 162 is disposed within the fastener receptacle 140. The fastener projection 162 may extend into the gap 138 between the rail 134 and the first or second floor panel 14, 16.

In other examples, first and second fastener components may include other types of fasteners to couple accessories to floor panels. In some examples, receptacles include enclosed slots, apertures, and/or threaded apertures that are configured to receive pins, hooks, bolts, and/or threaded fasteners. In other examples, first and second fasteners may include hook-and-loop fastener, snaps, buttons, ties, straps, and/or temporary adhesives. First and second fasteners may also include combinations of different types of fasteners.

Figure 7:
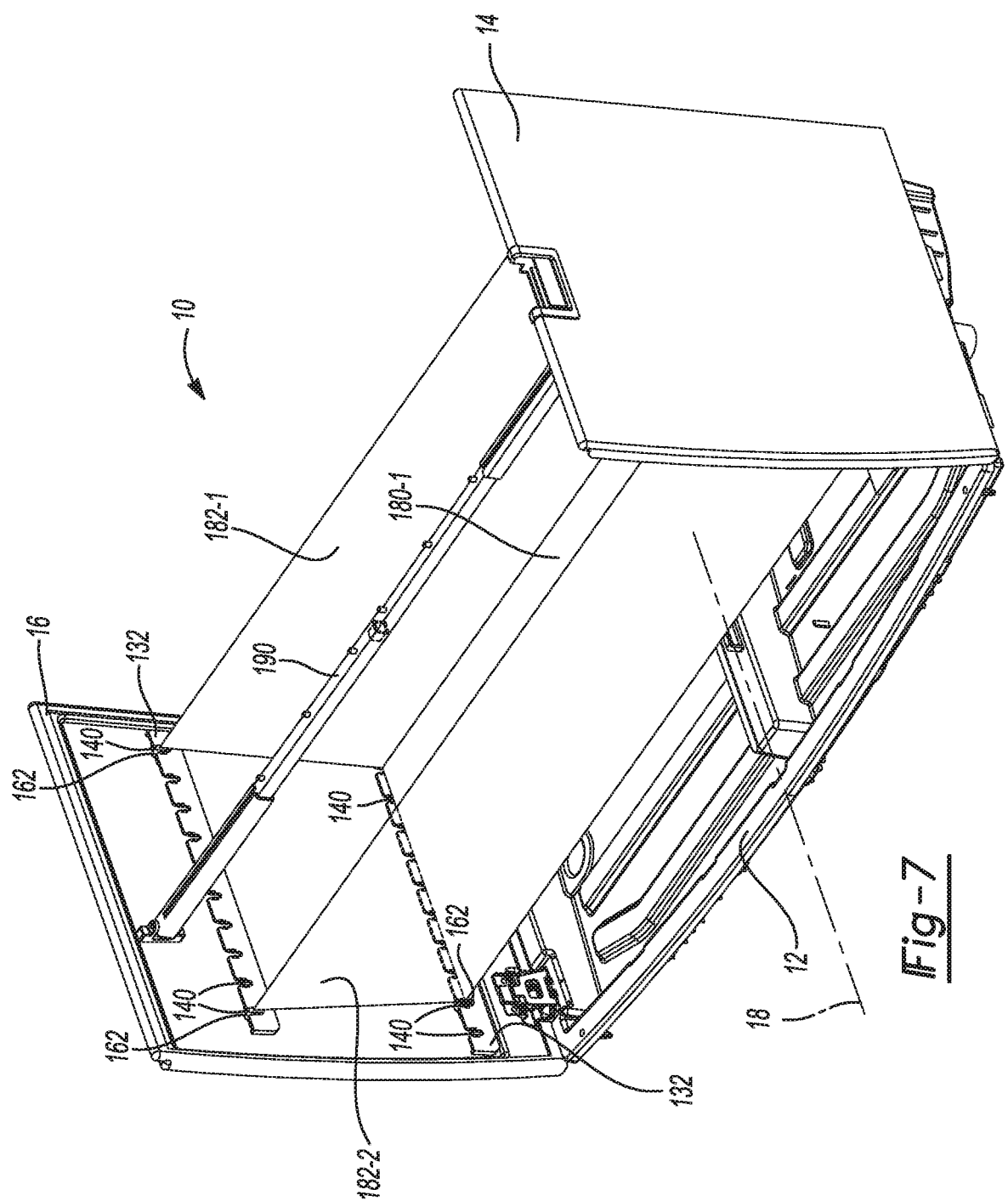
FIG. 7 is a perspective view of the reconfigurable storage assembly of FIG. 6A, the reconfigurable storage assembly being in a first configuration.

Returning to FIG. 4A, the underfloor storage compartment 120 of the base 12 may be used to store cargo and/or the accessories. The accessories include one or more partitions, such as covers 180 and walls 182. Each partition may be independently movable between a stowed position (FIG. 4A) and an installed position (FIG. 7). In the installed position, the partition extends transversely across at least a portion of a gap between the first floor panel 14 in the first open position and the second floor panel 16 in the second open position. In the stowed positions, the partitions may be folded or rolled (e.g., when the partition is flexible) or collapsed (e.g., when the partition includes rigid portions) and placed in the underfloor storage compartment 120. In other examples, such as when a partition is flexible, the partition may be stored on rollers, such as spring rollers.

The reconfigurable storage assembly further includes a transversely-extendable bar 190. The bar 190 is movable between a collapsed position (FIG. 4A) and an extended position (FIG. 6A). The bar 190 is in the collapsed position when the reconfigurable storage assembly 10 is in the fully-closed configuration. The bar 190 is coupled to at least one of the first and second floor panels 14, 16.

With reference to FIGS. 6A-6B, the transversely-extendable bar 190 is shown in the extended position. In the extended position, the bar 190 may connect the first and second floor panels 14, 16 to one another. The bar 190 may cooperate with the hinges 130 to retain the reconfigurable storage assembly 10 in the fully-open configuration. The bar 190 may be used to support hanging cargo, such as bags or clothing hangers.

The bar 190 includes a first portion 210 and a second portion 212. The first and second portions 210, 212 are pivotally coupled to the first and second floor panels 14, 16, respectively. The first portion 210 is pivotable about a first bar axis 214. The second portion 212 is pivotable about a second bar axis 216.

The first and second portions 210, 212 of the bar 190 are telescoping such that they have a relatively shorter length in the collapsed position and a relatively longer length in the extended position. The first portion 210 includes a first sleeve 218 that is coupled to the first floor panel 14 and a first arm 220 that is slidable with respect to the first sleeve 218. The second portion 212 includes a second sleeve 222 that is coupled to the second floor panel 16 and a second arm 224 that is slidable with respect to the second sleeve 222.

Each of the first and second arms 220, 224 includes a plurality of third or hanger projections 226. The hanger projections 226 may extend in an upward direction (i.e., away from the base 12) from the respective arm 220, 224. The hanger projections 226 may be used to support a handle of a bag or purse, for example. The hanger projection 226 may be a peg. In other examples, a bar may include additional or alternative hanger projections, such as knobs, hooks, and/or loops that extend upward, downward, forward, and/or rearward.

Each of the first and second sleeves 218, 222 includes an elongated slot 228. The elongated slots 228 provide clearance for the hanger projections 226 when the first and second arms 220, 224 are collapsed into the respective first and second sleeves 218, 222. The slots 228 may also facilitate proper alignment of the arms 220, 224 within the sleeves 218, 222 while moving the bar 190 between the collapsed position and the extended position.

The first and second portions 210, 212 are coupled to one another when the bar 190 is in the extended position. In one example, one of the first and second arms 220, 224 includes a projection and the other of the first and second arms 220, 224 includes a receptacle. In the example shown in FIGS. 6A-6B, the first arm 220 includes a fourth or bar protrusion 230 and the second arm 224 includes a second or bar receptacle 232. The bar protrusion 230 is received in the bar receptacle 232 to couple the first and second portions 210, 212 to one another, thereby retaining the bar 190 in its extended position.

Referring to FIG. 7, the reconfigurable storage assembly 10 is shown in a first configuration according to the principles of the present disclosure. In the first configuration, the first floor panel 14 is in the first open position, the second floor panel 16 is in the second open position, and the bar 190 is in the extended position. A first cover 180-1 is in a first installed position. In the first installed position, the first cover 180-1 may extend between the first outboard region 40 of the first floor panel 14 and the second outboard region 50 of the second floor panel 16 such that it acts as a floor onto which cargo may be disposed. The first cover 180-1 may extend parallel to the floor plane 61 (FIG. 2).

First and second walls 182-1, 182-2 are in second and third installed positions, respectively. The walls 182-1, 182-2 may be spaced apart and extend substantially parallel to one another. The first wall 182-1 may be disposed forward of the second wall 182-2 along the longitudinal axis 18. The walls 182-1, 182-2 may alternatively be installed at other longitudinal locations (i.e., coupled to different fastener receptacles 140). In some positions walls 182-1, 182-2 may extend nonparallel to one another.

With reference to FIG. 8, the reconfigurable storage assembly 10 is shown in a second configuration according to the principles of the present disclosure. In the second configuration, the first floor panel 14 is in the first open position, the second floor panel 16 is in the second open position, and the bar 190 is in the extended position. The walls 182 are in the stowed position. The first cover 180-1 and a second cover 180-2 are in the first installed position and a fourth installed position, respectively. In the fourth installed position, the second cover 180-2 may extend between the first inboard region 42 and the second inboard region 52 such that it acts as a canopy to conceal cargo. The covers 180-1, 180-2 may be spaced apart vertically and extend parallel to the floor plane 61.

The reconfigurable storage assembly 10 may further include a variety of accessories in addition to the cover 180 and wall 182, which may be selectively coupled to the first fastener components 132 in desired locations. The accessories may be removed, replaced, or reconfigured on the go. Non-limiting examples of accessories include containers, fasteners, and other utilities. The accessories may facilitate transporting different types of cargo, such as groceries, sporting equipment, luggage, school or office bags, waste, tools, first aid and other safety-related items, and/or pets.

Referring to FIG. 9, the reconfigurable storage assembly 10 is shown in a third or pet configuration according to the principles of the present disclosure. In the pet configuration, the first floor panel 14 is in the first open position, the second floor panel 16 is in the second open position, the bar 190 is in the extended position, the cover 180 is in the first installed position, and the wall 182 is in a fifth installed position. The reconfigurable storage assembly 10 may include accessories to facilitate transportation of animals, such as pets. The accessories may include a one or more containers for dispensing food and/or water. For example, a pet water bottle 250 is installed on the first floor panel 14 and a pet food dish 252 is installed on the second floor panel 16. Other pet-related accessories may include a treat dispenser, a litter box, a waste bag dispenser, a harness or leash, and/or a cage.

Figure 10:
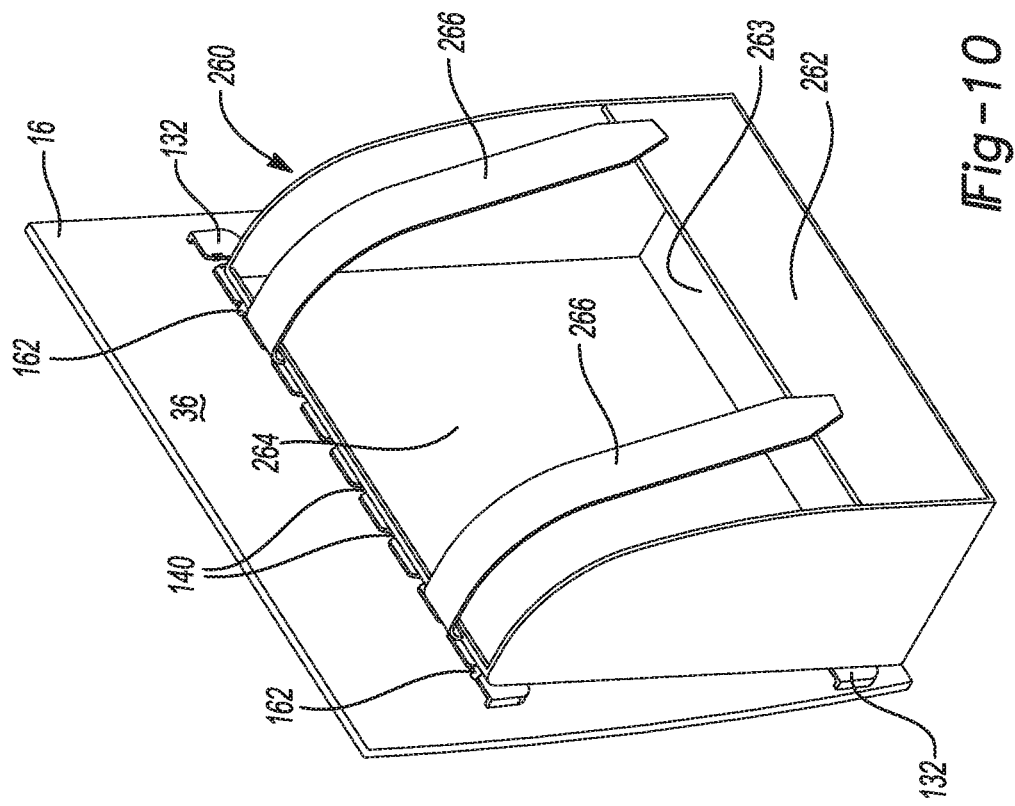
FIG. 10 is a perspective view of a container according to the present disclosure, the container being coupled to a floor panel of the reconfigurable storage assembly of FIG. 1.

Some accessories according to the principles of the present disclosure may include containers for holding items that are small, prone to rolling or sliding, delicate, or preferably kept clean. With reference to FIG. 10, a container 260 according to the principles of the present disclosure is provided. The container 260 is coupled to the second underside surface 36 of the second floor panel 16 via fastener receptacles 140 and fastener projections 162.

Figure 11:
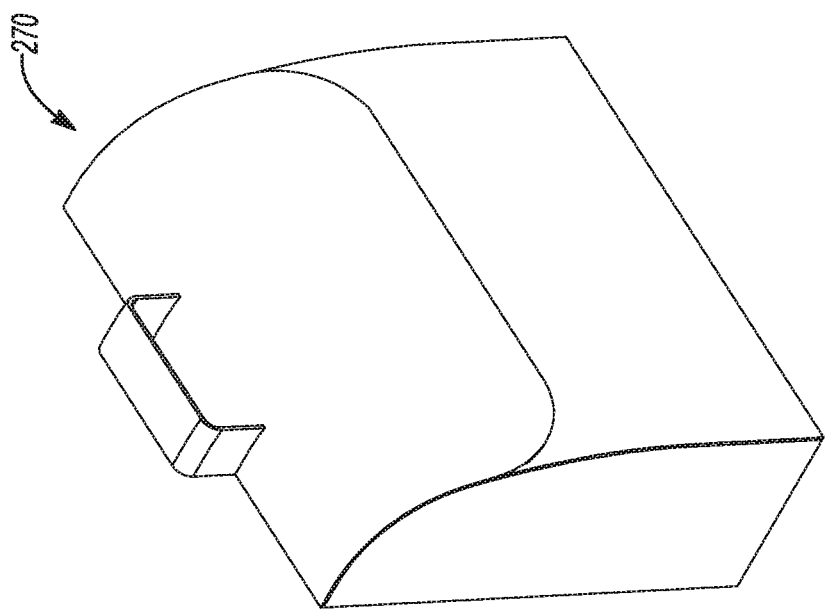
FIG. 11 is a perspective view of a backpack according to the principles of the present disclosure, the backpack configured to be disposed in the open-top container of FIG. 10.

The container includes a body 262, an inner area 263 in which cargo may be disposed, and an opening 264 to provide access to the inner area 263. In some examples, the container 260 is rigid. The container 260 may further include one or more straps 266 to retain the cargo within the container 260. In other examples, a container may be fully-enclosed or have more than one opening. An example of a backpack 270 to be stowed in the container 260 according to the principles of the present disclosure is shown in FIG. 11.

Figure 12:
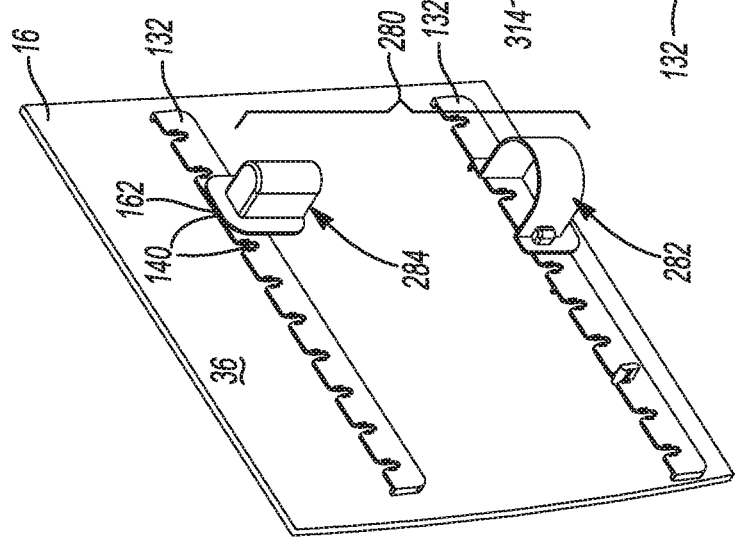
FIG. 12 is a perspective view of a bottle holder according to the present disclosure, the bottle holder being coupled to a floor panel of the reconfigurable storage assembly of FIG. 1.

Some accessories may facilitate transport of food and/or beverages, such as a thermally-insulated container, a bottle holder, and/or a beverage carrier. Referring to FIG. 12, a bottle holder 280 according to the principles of the present disclosure is provided. The bottle holder 280 is coupled to the second underside surface 36 of the second floor panel 16 via fastener receptacles 140 and fastener projections 162.

The bottle holder 280 may include a lower portion 282 and an upper portion 284. The lower portion 282 is configured to support a bottle (e.g., a wine bottle). The upper portion 284 is configured to retain a neck of the bottle. In some examples, at least one of an upper portion and a lower portion of a bottle holder is height adjustable to accommodate different sizes of bottles.

Figure 13:
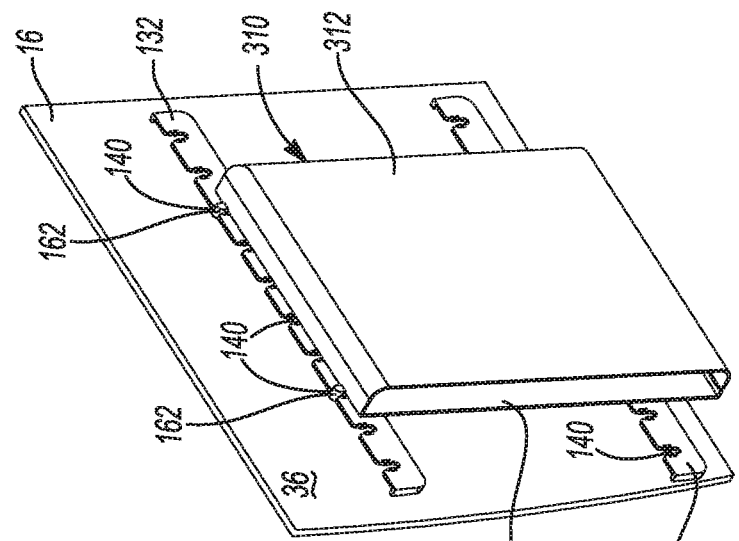
FIG. 13 is a perspective view of an electronics sleeve according to the present disclosure, the electronics sleeve being coupled to a floor panel of the reconfigurable storage assembly of FIG. 1.

Some accessories may facilitate transport of electronics, such as laptops, tablets, and/or e-readers. With reference to FIG. 13, a container according to the principles of the present disclosure may be an electronics sleeve 310. The electronics sleeve 310 is coupled to the second underside surface 36 of the second floor panel 16. The electronics sleeve 310 includes a body 312 and an opening 314. The body 312 may be padded. In some examples, the opening 314 may be closable, such as by a zipper or hook-and-loop fastener.

Other accessories may be suitable for various items. For example, referring to FIG. 14, a pocket or pouch 330 according to various aspects of the present disclosure is provided. The pocket 330 is coupled to the second underside surface 36 of the second floor panel 16. The pocket 330 may be formed from a flexible material, such as flexible netting. Accordingly, the pocket 330 may be a flexible pocket.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A reconfigurable storage assembly for a vehicle, the reconfigurable storage assembly comprising:
   a first floor panel including a first outboard region, a first inboard region, and a first underside surface, the first outboard region being configured to be coupled to a base of the vehicle, the first floor panel being configured to pivot in a first rotational direction from a first closed position to a first open position;
   a second floor panel including a second outboard region, a second inboard region, and a second underside surface, the second outboard region being configured to be coupled to the base, the second floor panel being configured to pivot in a second rotational direction opposite the first rotational direction from a second closed position to a second open position;
   a base at least partially defining an underfloor storage compartment having a first portion and a second portion, the base defining a ridge extending between the first portion and the second portion, the ridge configured to support the first floor panel in the first closed position and the second floor panel in the second closed position; and
   a closure assembly coupled to at least one of the first floor panel and the second floor panel, the closure assembly being configured to retain the first floor panel in the first closed position and the second floor panel in the second closed position, the closure assembly including a latch pivotally coupled to the first inboard region of the first floor panel, the latch being configured to engage the base to retain the first floor panel in the first closed position, the second inboard region of the second floor panel being disposed between the base and the first inboard region such that the second floor panel is retained in the second closed position.

2. The reconfigurable storage assembly of claim 1 wherein:
   the first floor panel in the first closed position and the second floor panel in the second closed position are configured to cooperate to prevent access to an underfloor storage compartment at least partially defined by the base; and
   the first underside surface faces the second underside surface when the first floor panel is in the first open position and the second floor panel is in the second open position.

3. The reconfigurable storage assembly of claim 1 further comprising a transversely-extendable bar coupled to at least one of the first underside surface and the second underside surface, the transversely-extendable bar being movable between a collapsed configuration and an extended configuration in which the transversely-extendable bar extends across a gap defined by the first floor panel in the first open position and the second floor panel in the second open position.

4. The reconfigurable storage assembly of claim 3 wherein the transversely-extendable bar includes a plurality of vertically-extending protrusions.

5. The reconfigurable storage assembly of claim 1 further comprising a partition configured to be disposed in a stowed configuration or an installed configuration in which the partition extends transversely across at least a portion of a gap between the first floor panel in the first open position and the second floor panel in the second open position.

6. The reconfigurable storage assembly of claim 5 wherein the partition is configured to extend parallel to a floor plane defined by the first floor panel in the first closed position and the second floor panel in the second closed position.

7. The reconfigurable storage assembly of claim 1 further comprising a plurality of fastener components, each fastener component of the plurality of fastener components being coupled to the first underside surface or the second underside surface.

8. The reconfigurable storage assembly of claim 7 wherein each fastener component of the plurality of fastener components includes a rail defining a plurality of receptacles.

9. The reconfigurable storage assembly of claim 7 further comprising a plurality of accessories configured to be selectively coupled to at least a portion of the plurality of fastener components.

10. The reconfigurable storage assembly of claim 9 wherein the plurality of accessories includes a bottle holder configured to hold a bottle, the bottle holder including a first portion configured to support the bottle and a second portion configured to retain a neck of the bottle.

11. The reconfigurable storage assembly of claim 9 wherein the plurality of accessories includes a flexible pocket.

12. The reconfigurable storage assembly of claim 9 wherein the plurality of accessories includes a container having a body and an interior region.

13. The reconfigurable storage assembly of claim 12 wherein the container is padded and is configured to retain an electronic device.

14. The reconfigurable storage assembly of claim 1 wherein;
   the first floor panel is configured to pivot 90° between the first open position and the first closed position; and
   the second floor panel is configured to pivot 90° between the second open position and the second closed position.

15. The reconfigurable storage assembly of claim 1 wherein:
   the first floor panel is configured to be retained in a first intermediate position between the first open position and the first closed position; and
   the second floor panel is configured to be retained in a second intermediate position between the second open position and the second closed position.

16. The reconfigurable storage assembly of claim 15 further comprising:
   a first torque hinge coupled to the first outboard region of the first floor panel; and
   a second torque hinge coupled to the second outboard region of the second floor panel.

17. A reconfigurable storage assembly for a vehicle, the reconfigurable storage assembly comprising:

a base at least partially defining an underfloor storage compartment;

a first floor panel including a first outboard region coupled to the base, a first inboard region, and a first underside surface, the first floor panel being configured to pivot with respect to the base in a first rotational direction from a first closed position to a first open position and a second rotational direction opposite the first rotational direction from the first open position to the first closed position;

a second floor panel including a second outboard region coupled to the base, a second inboard region, and a second underside surface, the second floor panel being configured to pivot in the second rotational direction from a second closed position to a second open position and the first rotational direction from the second open position to the second closed position; and a partition configured to be disposed in a stowed configuration or an installed configuration in which the partition extends transversely across at least a portion of a gap between the first floor panel in the first open position and the second floor panel in the second open position, the partition being configured to conceal cargo and extend parallel to a floor plane defined by the first floor panel in the first closed position and the second floor panel in the second closed position.

18. A reconfigurable storage assembly for a vehicle, the reconfigurable storage assembly comprising:

a base at least partially defining an underfloor storage compartment;

a first floor panel including a first outboard region coupled to the base, a first inboard region, and a first underside surface, the first floor panel being configured to pivot with respect to the base in a first rotational direction from a first closed position to a first open position and a second rotational direction opposite the first rotational direction from the first open position to the first closed position;

a second floor panel including a second outboard region coupled to the base, a second inboard region, and a second underside surface, the second floor panel being configured to pivot in the second rotational direction from a second closed position to a second open position and the first rotational direction from the second open position to the second closed position;

a partition configured to be disposed in a stowed configuration or an installed configuration in which the partition is coupled to the first underside surface of the first floor panel in the first open position and the second underside surface of the second floor panel in the second open position;

a container configured to be coupled to at least one of the first underside surface and the second underside surface, the container being configured to dispense food or water for an animal;

a base at least partially defining an underfloor storage compartment having a first portion and a second portion, the base defining a ridge extending between the first portion and the second portion, the ridge configured to support the first floor panel in the first closed position and the second floor panel in the second closed position; and a closure assembly coupled to at least one of the first floor panel and the second floor panel, the closure assembly being configured to retain the first floor panel in the first closed position and the second floor panel in the second closed position, the closure assembly including a latch pivotally coupled to the first inboard region of the first floor panel, the latch being configured to engage the base to retain the first floor panel in the first closed position, the second inboard region of the second floor panel being disposed between the base and the first inboard region such that the second floor panel is retained in the second closed position.

* * * * *